US007670415B1

(12) United States Patent
Rosenberg et al.

(10) Patent No.: US 7,670,415 B1
(45) Date of Patent: *Mar. 2, 2010

(54) VAPOR BARRIER FOR POROUS STRUCTURES AND SYSTEM

(75) Inventors: David Rosenberg, Jersey City, NJ (US); David C. Darwin, Wayne, NJ (US); John de Mars, Sunnyvale, CA (US); Eugene B. Humphrey, Hamden, CT (US); Todd B. Humphrey, legal representative, Hamden, CT (US); Michael S. Rhodes, Bronx, NY (US); Philip S. Rhodes, legal representative, Bronx, NY (US); Philip S. Rhodes, Teaneck, NJ (US); James R. Humphrey, Southington, CT (US); Leonid Izrailev, Brooklyn, NY (US); John Wojakowski, Topeka, KS (US); Jason Tuerack, Jericho, NY (US)

(73) Assignee: Hycrete, Inc., Carlstadt, NJ (US)

( * ) Notice: Subject to any disclaimer, the term of this patent is extended or adjusted under 35 U.S.C. 154(b) by 140 days.

This patent is subject to a terminal disclaimer.

(21) Appl. No.: 11/848,651

(22) Filed: Aug. 31, 2007

Related U.S. Application Data

(63) Continuation-in-part of application No. 11/590,624, filed on Oct. 31, 2006, now Pat. No. 7,407,535.

(51) Int. Cl.
C09K 3/18 (2006.01)
C09K 3/00 (2006.01)
C04B 24/04 (2006.01)
C04B 103/00 (2006.01)
C04B 103/60 (2006.01)
C04B 111/27 (2006.01)
C09D 5/08 (2006.01)
C23F 11/00 (2006.01)
B05D 1/02 (2006.01)
B05D 1/28 (2006.01)
B05D 5/00 (2006.01)

(52) U.S. Cl. ............. 106/2; 106/14.13; 106/14.41; 106/14.44; 106/728; 106/810; 427/299; 427/368; 427/384; 427/419.8; 427/421.1; 427/429

(58) Field of Classification Search .............. 106/2, 106/14.13, 14.41, 14.44, 728, 810; 427/299, 427/368, 384, 419.8, 421.1, 429
See application file for complete search history.

(56) References Cited

U.S. PATENT DOCUMENTS

| | | | |
|---|---|---|---|
| 3,682,718 A | 8/1972 | Palm et al. | |
| 3,763,083 A | 10/1973 | Grotheer | |
| 4,869,752 A | 9/1989 | Jaklin | |
| 6,071,436 A | 6/2000 | Incorvia | |
| 6,277,450 B1 | 8/2001 | Katoot et al. | |
| 6,605,577 B1 | 8/2003 | Harrison et al. | |
| 7,261,923 B2 * | 8/2007 | Rhodes et al. | 427/384 |
| 7,381,252 B2 * | 6/2008 | Rhodes et al. | 106/14.41 |
| 7,407,535 B1 * | 8/2008 | Humphrey et al. | 106/14.41 |
| 7,498,090 B2 * | 3/2009 | Rhodes et al. | 428/703 |
| 7,513,948 B1 * | 4/2009 | Humphrey et al. | 106/810 |
| 2004/0237834 A1 | 12/2004 | Humphrey et al. | |
| 2004/0237835 A1 | 12/2004 | Rhodes et al. | |
| 2006/0096497 A1 | 5/2006 | Rhodes et al. | |

FOREIGN PATENT DOCUMENTS

| | | |
|---|---|---|
| JP | 4-255709 | 9/1992 |
| JP | 6-115992 | 4/1994 |
| WO | 85/05066 | 11/1985 |
| WO | 97/20900 | 6/1997 |
| WO | 98/01509 | 1/1998 |
| WO | 02/43881 | 6/2002 |

OTHER PUBLICATIONS

Allyn Jr. et al, "Strength And Durability Of Concrete Containing Salts Of Alkenyl-Succinic Acid", ACI Materials Journal, 98(1), pp. 52-58 (Jan.-Feb. 2001).
Allyn Jr. et al, "Corrosion Tests With Concrete Containing Salts Of Alkenyl-Substituted Succinic Acid", ACI Materials Journal, 98(3), pp. 224-232 (May-Jun. 2001).
Goodwin, et al., Protection of Reinforcement With Corrosion Inhibitors, Phase II, Dec. 2002, 125 pages.
Civjan, et al., Performance Evaluation and Economic Analysis of Combinations of Durability Enhancing Admixtures (Mineral and Chemical) in Structural Concrete for The Northeast U.S.A., Feb. 2003, 165 pages.

* cited by examiner

*Primary Examiner*—Anthony J Green
(74) *Attorney, Agent, or Firm*—McCarter & English, LLP

(57) ABSTRACT

Systems and methods for enhanced moisture vapor barrier performance for concrete-containing materials and surfaces are disclosed. Treatment modalities that include addition of the disclosed materials, compositions and systems to pre- and post-construction concrete-containing materials and surfaces are provided. Moisture vapor barrier properties are effected over an extended period of time as compared to control systems. The disclosed compositions and systems also yield reductions in the rate and/or impact of corrosion are achieved for concrete-containing structures and surfaces and, despite the water soluble properties of the compositions and systems, the treatments are effective in delivering an advantageous level of liquid moisture resistance to the treated concrete-containing structure and/or surface. The composition is synthesized from a feedstock that includes $C_9$ to $C_{16}$ branched hydrocarbons of varying structures.

20 Claims, 2 Drawing Sheets

VAPOR BARRIER FOR POROUS STRUCTURES AND SYSTEM

CROSS-REFERENCE TO RELATED APPLICATIONS

The present application is a continuation-in-part application that claims the benefit of, commonly assigned non-provisional patent application entitled "Corrosion Resistant Compositions for Treatment of Concrete Structures," which was filed on Oct. 31, 2006 and assigned Ser. No. 11/590,624, now U.S. Pat. No. 7,407,535. The entire content of the foregoing non-provisional patent application is incorporated herein by reference.

BACKGROUND OF THE INVENTION

1. Technical Field

The present disclosure generally relates to advantageous systems and methods that offer vapor barrier properties to porous structures, e.g., concrete structures. The disclosed systems and methods utilize water soluble materials that may be incorporated into the porous structure, e.g., concrete structure, at various points in time, e.g., at the pre-hardening stage, the post-hardened stage, or combinations thereof.

2. Description of Background Art

The cost of corrosion and other structural defects in materials is devastating with respect to damage and deterioration to structures as well as the potential for human injury. From a financial perspective, the cost of corrosion alone is estimated to be over $300 billion each year in the United States. The problem of preventing corrosion and addressing other potential structural defects remains a challenge confronting the construction and maintenance industries.

Commonly, structures are made of concrete materials. Because conventional concrete has very low tensile strength, it is common practice to reinforce concrete with steel bars in applications where the concrete is subjected to substantial loads. In such implementations, the concrete has at least two functions. One function is to protect the reinforcing steel bars against corrosion. Another prominent function is to improve resistance from shear and compressive stresses. As a general matter, the protective effect of hardened concrete against climatic and environmental conditions on reinforcing steel depends, for example, on the amount and type of cement, water/cement factor and concrete integrity. However, since concrete is also a permeable absorptive material, concrete is often subject to undesirable intrusion of moisture and other substances, each of which can lead to corrosion of the reinforcing steel.

Indeed, concrete is widely known to be a porous material with a vast network of interconnected pores. When the pores of concrete are occupied by water and the relative humidity of the ambient atmosphere is unsaturated, moisture vapor will be emitted from the concrete. In many circumstances, the moisture vapor emissions from concrete simply become part of the humidity of the air. However, in some circumstances, especially involving concrete slabs that accommodate flooring overlay materials, the moisture vapor emission from the concrete causes negative consequences, such as degradation of the flooring glue and delamination of the flooring material. For at least the foregoing reasons, it is advantageous to reduce or eliminate the moisture vapor emission from concrete.

There are numerous methods in practice for reducing moisture vapor emission from concrete systems. Particular methods are frequently employed based at least in part on the source of the moisture-at-issue. In the case of free mix water or surface rain water potentially emerging from a concrete structure/system, various sealant systems and drying techniques have been used to reduce the rate of moisture vapor emission to acceptable levels. These methods are expensive and labor intensive to apply. In the case of groundwater wicking through a concrete slab and emerging as moisture vapor, various polymer sheet vapor barriers have been used to prevent or reduce the degree to which the groundwater contacts the concrete and wicks therethrough. Such sheets involve additional cost/labor and are susceptible to various levels of unreliability due to seams and punctures.

It is noted that efforts have been made to solve the premature deterioration of concrete structures. For example, U.S. Pat. No. 4,869,752 to Jaklin describes the use of modified inorganic silicates, e.g., modified alkali silicates, as a concrete additive to prevent corrosion of steel structures or reinforcing steel. U.S. Pat. No. 6,277,450 to Katoot describes the use of a coating process to coat metal surfaces which are modified to an active moiety of metal hydroxide receptive to a fully cross-linked polymer of various thickness. Other processes that have been used have included precoating surfaces of metals used in the building and construction industry. However, such methods are generally costly, ineffective and inefficient/impractical.

In commonly assigned applications, materials and systems for treatment of concrete structures have been disclosed. U.S. Patent Publication No. 2004/0237834 to Humphrey et al. discloses a composition for concrete treatment and a method for synthesis thereof. The disclosed composition is an alkali-based salt solution of a dioic acid of the following chemical formula:

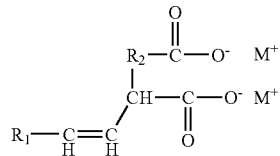

wherein M+ is selected from the group comprising Na+ and K+; $R_1$ is a $C_1$ to $C_{24}$ branch or linear aliphatic compound; and $R_2$ is a $C_1$ to $C_{10}$ branch or linear aliphatic compound.

U.S. Patent Publication No. 2004/0237835 to Rhodes et al. discloses a further concrete treatment system that includes the alkali-based salt solution of a dioic acid of the Humphrey et al. patent publication (U.S. Patent Publication No. 2004/0237834) in combination with a defoaming agent, e.g., a polyether modified polysilixane, tri-alkane/alkene phosphates and mixtures thereof. The disclosed defoaming agent is effective in reducing excessive air entrainment and/or foaming during preparation of concrete mixes and in controlling air content of the cured concrete.

Reference is also made to a pair of publications by Mark Allyn, Jr. and Gregory C. Frantz. In a first publication, Allyn, Jr., et al. describe strength and durability testing of concrete containing salts of alkenyl-succinic acid, specifically disodium tetrapropenyl succinate (DSS) and diammonium tetrapropenyl succinate (DAS). [Allyn, Jr., et al., "Strength and Durability of Concrete Containing Salts of Alkenyl-Succinic Acid," ACI Materials Journal, January-February 2001, pages 52-58]. In a second publication, Allyn, Jr., et al. describe corrosion testing of the foregoing materials over a 48 week period. [Allyn, Jr., et al., "Corrosion Tests with Concrete Containing Salts of Alkenyl-Substituted Succinic Acid," ACI Materials Journal, May-June 2001, pages 224-232.] Neither of the Allyn, Jr., et al. publications provides structural details of the disclosed composition nor teachings as to synthesis of the disclosed composition.

Despite efforts to date, a need remains for treatments, materials and processes that can reduce and/or eliminate vapor transmission, e.g., moisture transmission, through porous structures such as concrete-containing structures in an efficient, reliable and cost-effective manner. These and other needs are advantageously satisfied by the disclosed treatment systems and methods.

SUMMARY OF THE PRESENT DISCLOSURE

According to the present disclosure, systems and methods for reducing and/or eliminating vapor transmission, e.g., moisture transmission, through porous structures are provided. The disclosed systems and methods have particular applicability to concrete-containing structures and systems, although implementations in alternative systems may benefit from the disclosed moisture barrier properties and/or functionalities. For simplicity, the present disclosure is directed primarily to concrete-based systems and implementations. However, the present disclosure is not limited thereto.

According to exemplary embodiments of the present disclosure, an aqueous solution of a blend or mixture of molecules/compounds is utilized to provide vapor barrier properties/functionalities to a porous structure/system, e.g., a concrete-containing structure/system. Indeed, use of the disclosed blends/mixtures has resulted in unexpected moisture vapor barrier performance in concrete systems. The disclosed blend/mixture of water soluble materials includes molecules of the following formula:

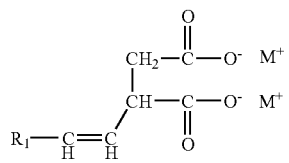

wherein $R_1$ is a $C_9$ to $C_{16}$ branched hydrocarbon and M+ is Na+ or K+. Of note, the disclosed water soluble material constitutes a mixture or blend of molecules of the above-noted formula, but the precise chemical formula of the molecules included in the mixture/blend are non-uniform. Thus, in a typical blend/mixture, a percentage of the molecules are characterized by $R_1=C_9$, a percentage of the molecules are characterized by $R_1=C_{10}$, a percentage of the molecules are characterized by $R_1=C_{11}$, etc. On a weighted basis, the average $R_1$ hydrocarbon chain length is typically in the range of $C_{12}$.

Of note, the disclosed water soluble blend/mixture includes hydrocarbon molecules featuring branched side chains of varying carbon lengths. However, all or substantially all of the branched side chains include a specified number of carbon atoms, namely between nine (9) and sixteen (16) carbon atoms. It has been found that branched side chains falling within a range of $C_9$ to $C_{16}$ (inclusive) contribute to the effectiveness of the disclosed material, composition or system in enhancing vapor barrier properties, including specifically moisture barrier properties. The inclusion of shorter branched hydrocarbon side chains (e.g., $C_8$ and less) is generally ineffective because, when incorporated into a concrete-containing structure (whether at the mixing/formulation stage or at the post-construction stage), such smaller hydrocarbon side chains are highly likely to be washed away by permeating water, thereby failing to perform the advantageous autogeneous healing functions of the disclosed system and method. With reference to longer branched hydrocarbon side chains (e.g., $C_{17}$ and higher), it has been found that such longer chain molecules raise substantial water solubility issues. Thus, according to the present disclosure, a critical branched side chain range has been identified that advantageously achieves optimal properties and performance, as described herein.

With reference to the sodium/potassium constituents, exemplary blends/mixtures according to the present disclosure generally include molecules that include each of the alkali metal constituents. Thus, M+ for purposes of a percentage of the molecules in the disclosed blend/mixture is sodium, while M+ for purposes of a second percentage of the molecules in the disclosed blend/mixture is potassium, and M+ for a third percentage of the molecules in the disclosed blend/mixture is sodium as to one position and potassium as to the second position. In an exemplary embodiment of the present disclosure, on a molar basis, sodium constitutes about 90 to 100% and potassium constitutes about 0 to 10%.

The disclosed mixtures/blends of water soluble materials are useful in treatment modalities wherein the concrete is being mixed/formulated as well as treatment modalities wherein hardened concrete structures and/or surfaces are subjected to one or more applications of an advantageous water soluble composition, material or system. The disclosed treatment modalities are effective in enhancing vapor barrier properties in hardened concrete structures, and in reducing the rate and/or impact of corrosion in or for a concrete-containing structure/surface. In addition, despite the water soluble properties of the disclosed material, composition or system, treatments involving the disclosed material, composition or system are effective in delivering an advantageous level of moisture resistance to the treated concrete-containing structure and/or surface.

Of note, although the water molecules in the liquid and vapor phases are the same, it is not necessarily the case that a material that retards the movement of liquid water will also retard the movement of water vapor. The potential effectiveness of a prospective flow inhibitor for liquid water systems as compared to moisture vapor systems will depend on many variables that generally cannot be predicted from system-to-system. In the present case, the effectiveness of the disclosed branched mixture/blend in inhibiting liquid water flow in concrete-containing systems was not predictive of the effectiveness vel non of the disclosed mixture/blend in inhibiting moisture vapor flow.

In exemplary embodiments of the present disclosure, the water soluble material, composition or system may be added during cement formulation at various water-cement ratios. In alternative exemplary embodiments, the disclosed water soluble material, composition or system may be applied to a hardened concrete-containing structure or surface through various treatment techniques, e.g., by spraying, brushing or misting an effective amount of the disclosed material, composition or system onto one or more surfaces of the concrete-containing structure. The treated structure(s) advantageously demonstrate and/or effect: (i) reduced moisture vapor flow through the concrete structure; (ii) improved corrosion properties, e.g., a substantially reduced corrosion rate; and (iii) advantageous resistance to water permeation.

An advantageous technique for synthesizing the disclosed materials, compositions and systems is provided herein. Of note, the active compositions disclosed herein are water soluble and are generally stored, distributed and utilized in an aqueous form. In an exemplary implementation of the present disclosure, the active ingredient is present in the aqueous solution at a level of about 20% by weight. Despite the solubility of the active ingredients/compositions disclosed herein, such ingredients/compositions are effective to inhibit and/or prevent water and moisture vapor penetration in situ, i.e., in cement-containing structures.

Exemplary solutions and systems of the present disclosure may further include a thinning agent and/or a carrier that is effective to reduce the viscosity of the disclosed solution/system, particularly for post-construction treatments, i.e., treatments for hardened concrete structures/surfaces. For example, a thinning agent may be incorporated into the disclosed solution/system in an amount of about 5% to about 70% by weight. The thinning agent advantageously facilitates penetration of the disclosed water soluble solution/system into the concrete-containing structure, e.g., through pores, cracks and/or fissures formed or defined in the concrete-containing structure. Exemplary thinning agents include isopropyl alcohol or a similar solvent (or combinations thereof). Of note, the disclosed thinning agents may additionally function to reduce the potential for impurity(ies) to react with the disclosed solution/system, e.g., potential reactions with Ca+ ions in the concrete-containing structures, thereby enhancing the stability and/or overall effectiveness of the disclosed solution/system.

Post-construction materials and structures that may be treated with the disclosed solutions/systems vary widely, and include structures such as reinforced or un-reinforced concrete assemblies or elements, mortar, stucco and the like. Other non-concrete containing porous structures/systems may also benefit from the vapor barrier properties of the disclosed materials. In exemplary embodiments of the present disclosure, the disclosed solution/system may be applied directly to the exterior surface of a reinforced and/or un-reinforced concrete structure and be permitted to penetrate to interior regions thereof, e.g., by capillary action.

Additional features, functionalities and beneficial results associated with the disclosed solution/system and treatment modalities associated therewith will be apparent from the detailed description which follows.

BRIEF DESCRIPTION OF THE FIGURES

To assist those of ordinary skill in the art in making and using the disclosed systems and methods, reference is made to the accompanying figures, wherein.

DETAILED DESCRIPTION OF EXEMPLARY EMBODIMENT(S)

Figure 1:
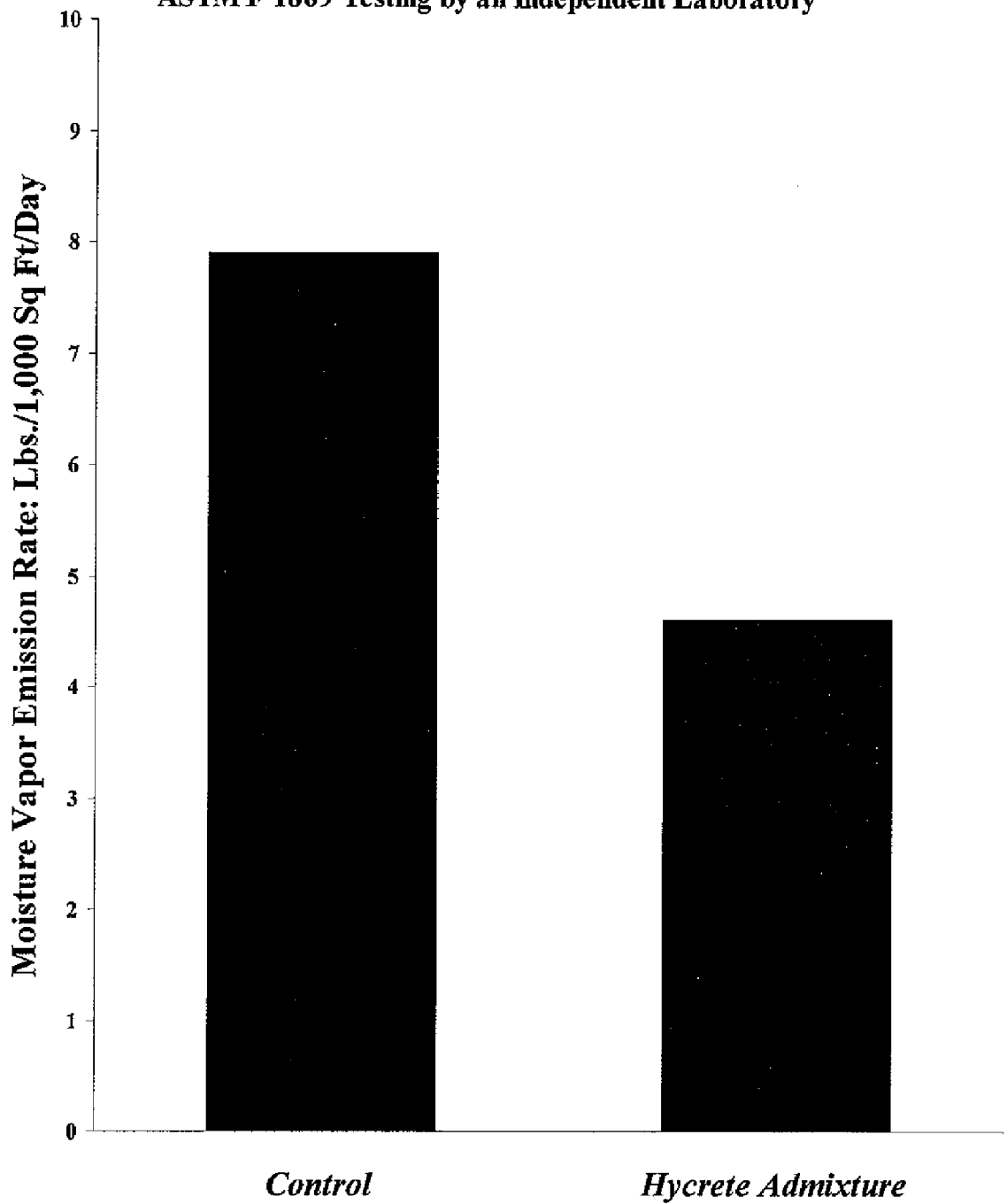
FIG. 1 is a plot of slab moisture vapor emission rate for concrete systems according to the present disclosure as compared to a control system after simulated rain.

Systems and methods for reducing or preventing vapor flow through a porous structure/system, e.g., a concrete-containing structure/system, are disclosed. Treatment modalities that include addition of the disclosed materials, compositions and systems to pre- and post-construction concrete-containing materials and surfaces are advantageously provided. Enhanced vapor barrier properties/functionalities are effected through the addition of the disclosed materials, compositions and systems to porous structures/systems, e.g., concrete-containing structures/systems. In addition, reductions in the rate and/or impact of corrosion are achieved for concrete-containing structures/surfaces and, despite the water soluble properties of the disclosed material, composition and system, the disclosed treatments are effective in delivering an advantageous level of moisture resistance to the treated concrete-containing structure and/or surface.

The water soluble material, composition or system may be added during cement formulation at various water-cement ratios. The formulation of cement mixtures is well known to persons skilled in the art, and a detailed discussion thereof will not be provided herein. It is to be noted that the disclosed materials, compositions and systems may be utilized in essentially any concrete application, and the level of treatment may generally be in the range of about 0.01% to about 0.25% by weight relative to the underlying concrete/water formulation. In particular exemplary embodiments of the present disclosure, the treatment level is in the range of about 0.04% to about 0.1% by weight relative to the underlying concrete/water formulation. The disclosed materials, compositions and systems offer beneficial results to many users including, inter alia, concrete producers, builders, designers and owners. Among the benefits afforded by the disclosed materials, compositions and systems are cost savings, schedule acceleration and sustainable construction solutions. Exemplary projects/implementations include, inter alia, deep foundation slabs and walls, podium and plaza decks, roof, parking and tunnel structures.

Beyond the vapor barrier properties/functionalities disclosed herein, the disclosed materials, compositions and systems advantageously deliver integral waterproofing that essentially eliminates the need for external membranes, coatings and sheeting treatments with respect to potential liquid water flow. With the disclosed materials, compositions and systems, concrete may be batched therewith to achieve hydrophobic performance (e.g., less than 1% absorption under the British Standard Absorption Test, BSI 1881-122). As described herein, treatment with the disclosed materials, compositions and systems advantageously transforms concrete from an open network of capillaries and cracks into a structure that exhibits ultra-low absorption characteristics, thereby effecting a desirable level of waterproofing and resultant anti-corrosive functionality. To the extent the concrete structure/system is exposed to moisture vapor, the disclosed materials, compositions and systems have been found to provide advantageous moisture vapor barrier properties/functionalities in concrete-containing structures/systems.

The disclosed materials, compositions and systems provide three distinct and advantageous levels of protection. First, the disclosed materials, compositions and systems protect the reinforcing steel that is frequently incorporated into concrete structures by coating the steel surface with a monomolecular film. With reference to the molecules included in the disclosed blends/mixtures, one end of each individual molecule is polar and attaches to other polar particles, such as iron or other metallic molecules. In this way, the disclosed materials, compositions and systems become bonded with respect to iron ions present at the steel surface, thereby preventing potential oxidation and associated corrosion of such surface.

Second, the disclosed materials, compositions and systems provide advantageous waterproofing properties to the concrete by reacting, in situ, with divalent metals to form long chain obstructions within concrete capillaries, fissures and other potential passages. Thus, as water (or another liquid) attempts to penetrate a treated concrete structure/surface, the disclosed materials, compositions and systems within the concrete structure/surface are solubilized, i.e., re-enter the aqueous phase, and react with divalent metals present in the penetrating liquid and/or the concrete to form long chain molecules that impede further penetration/intrusion by the water. Like oil repels water, this reaction product fills the capillaries of the concrete, repelling water and shutting down capillary absorption.

Third, the disclosed materials, compositions and systems provide advantageous moisture vapor barrier properties/functionalities to the concrete structure/surface.

As noted herein, the disclosed water soluble material, composition or system may be applied to a hardened concrete-containing structure or surface through various treatment techniques, e.g., by spraying, brushing or misting an effective amount of the disclosed material, composition or system onto one or more surfaces of the concrete-containing structure. The treated structure(s) advantageously demonstrate moisture vapor barrier properties/functionalities, improved corrosion properties, e.g., a substantially reduced corrosion rate, and the treated structure(s) advantageously resist water permeation.

According to the present disclosure, an aqueous solution of a blend or mixture of compounds is utilized to achieve the desired properties and functionalities. The disclosed water soluble blend/mixture includes hydrocarbon molecules featuring branched side chains of varying carbon lengths. However, all or substantially all of the branched side chains include a specified number of carbon atoms, namely between nine (9) and sixteen (16) carbon atoms. It has been found that branched side chains falling within a range of $C_9$ to $C_{16}$ (inclusive) are critical to the effectiveness of the disclosed material, composition or system. The inclusion of shorter branched hydrocarbon side chains (e.g., $C_8$ and less) is ineffective because, when incorporated into a concrete-containing structure (whether at the mixing/formulation stage or at the post-construction stage), such smaller hydrocarbon side chains are highly likely to be washed away by permeating water, thereby failing to perform the advantageous autogenous healing, anti-corrosion and moisture resistance functions of the disclosed treatment. With reference to longer branched hydrocarbon side chains (e.g., $C_{17}$ and higher), it has been found that such longer chain molecules raise substantial water solubility issues. Thus, according to the present disclosure, a critical branched side chain range has been identified that advantageously achieves optimal properties and performance.

The disclosed water soluble material, composition or system includes molecules of the following formula:

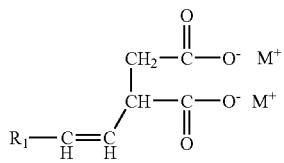

wherein $R_1$ is a $C_9$ to $C_{16}$ branched hydrocarbon and M+ is Na+ or K+. Of note, the disclosed water soluble material constitutes a mixture or blend of molecules of the above-noted formula, but the precise chemical formula of the molecules included in the mixture/blend are non-uniform. Thus, in a typical blend/mixture, a percentage of the molecules are characterized by $R_1=C_9$, a percentage of the molecules are characterized by $R_1=C_{10}$, a percentage of the molecules are characterized by $R_1=C_{11}$, etc. On a weighted basis, the average $R_1$ hydrocarbon chain length is typically in the range of $C_{12}$.

With reference to the sodium/potassium constituents, exemplary blends/mixtures according to the present disclosure generally include molecules that include each of the alkali metal constituents. Thus, M+ for purposes of a percentage of the molecules in the disclosed blend/mixture is sodium, while M+ for purposes a second percentage of the molecules in the disclosed blend/mixture is potassium, and M+ for a third percentage of the molecules in the disclosed blend/mixture is sodium as to one position and potassium as to the second position. In an exemplary embodiment of the present disclosure, on a molar basis, sodium constitutes about 90 to 95% and potassium constitutes about 5 to 10%.

An advantageous technique for synthesizing the disclosed materials, compositions and systems involves a multi-stage process. In a first stage, a feed stream is fed to a first reaction chamber. An exemplary feed stream for synthesis of the disclosed materials, compositions and systems is characterized as follows:

A mixture/blend of unsaturated branched $C_9$ to $C_{16}$ hydrocarbon molecules;
Non-homogeneous branching;
Non-homogeneous double/triple bond locations;
An overall absence of cyclic molecules; and
A weighted average of hydrocarbon chain lengths that generally corresponds to about $C_{12}$.

Feed streams satisfying the foregoing specifications may be sourced from conventional chemical supply sources, as will be apparent to persons skilled in the art.

The foregoing feed stream is generally fed to a reactor for reaction with a maleic anhydride (2,5-furandione) of general formula:

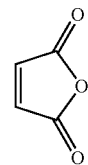

The unsaturated feed stream reacts with the maleic anhydride (in a liquified/molten form) through an addition reaction until such time as the maleic anhydride is consumed. Reaction conditions generally involve an elevated temperature of about 400° F. to about 430° F. and an elevated pressure of about 30-40 psi. The foregoing addition reaction forms an addition compound of the following formula:

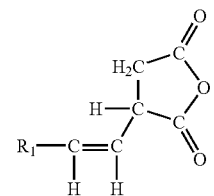

wherein $R_1$ is a $C_9$ to $C_{16}$ branched hydrocarbon.

The addition compound is generally separated from the unreacted feedstock and undesired by-products through vacuum distillation. According to exemplary processing implementations, a two pass vacuum distillation is employed (although single stage separation may be employed through appropriate separation techniques). In a first pass, unreacted feed stream constituents are flashed off at temperatures of about 350° F. In the second pass, the addition product is flashed at temperatures of about 450° F. The addition product is typically yellow in color. Residual byproducts, e.g., tars and the like, are typically discarded and/or reclaimed.

In a next reaction stage, the addition compound is generally reacted with deionized water at an elevated temperature, e.g., at or about the boiling point of water, to form a diacid. By such reaction, a diacid of general formula is formed:

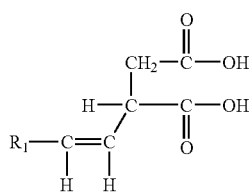

wherein $R_1$ is a $C_9$ to $C_{16}$ branched hydrocarbon. The diacid product formed by the foregoing reaction is generally a resinous solid that is soluble in water.

In the next synthesis stage, the diacid is reacted with a caustic solution that includes both sodium hydroxide and potassium hydroxide. In an exemplary embodiment, both hydroxides are supplied as aqueous solutions to a reaction chamber, e.g., at weight percentages of about 25% (with deionized water). The caustic solution generally includes sodium hydroxide at a 90 to 95 weight percentage and potassium hydroxide at a 5 to 10 weight percentage. The reaction vessel is typically closed and sufficient headroom is maintained to allow controlled pressure buildup during the reaction process. As the diacid reacts with the caustic solution, an intermediate product is generally formed of the following formula:

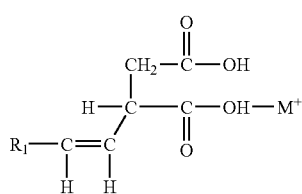

Further reaction with caustic solution yields a salt of general formula:

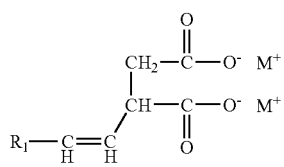

wherein $R_1$ is a $C_9$ to $C_{16}$ branched hydrocarbon and M+ is Na+ or K+ (or one of each). pH conditions within the reaction chamber are generally monitored and the reaction is complete when the pH reaches a neutral condition, thereby evidencing depletion of the caustic solution. The salt is generally soluble in water and defines the active ingredient for purposes of the disclosed material, composition and system.

According to exemplary embodiments of the present disclosure, utilization of both sodium hydroxide and potassium hydroxide has been found to be advantageous to minimize the likelihood that the active ingredient will aggregate and precipitate from an aqueous solution. The active ingredient is generally supplied as an aqueous solution, e.g., 20% by weight active ingredient (with deionized water). The interspersion of different metals has been found to significantly decrease the potential for undesirable precipitation of the active ingredient from the aqueous solution. Thus, the active materials, compositions and systems disclosed herein are water soluble and are generally stored, distributed and utilized in an aqueous form. Despite the solubility of the active ingredients/compositions disclosed herein, such ingredients/compositions are effective to inhibit and/or prevent water and moisture vapor penetration in situ.

Exemplary solutions and systems of the present disclosure may further include a thinning agent and/or a carrier that is effective to reduce the viscosity of the disclosed solution/system, particularly for post-construction treatments, i.e., treatments for hardened concrete structures/surfaces. For example, a thinning agent may be incorporated into the disclosed solution/system in an amount of about 5% to about 70% by weight. The thinning agent advantageously facilitates penetration of the disclosed water soluble solution/system into the concrete-containing structure, e.g., through pores, cracks and/or fissures formed or defined in the concrete-containing structure. Exemplary thinning agents include isopropyl alcohol or a similar solvent (or combinations thereof). Of note, the disclosed thinning agents may additionally function to reduce the potential for impurity(ies) to react with the disclosed corrosion-inhibiting solution/system, e.g., potential reactions with Ca+ ions in the concrete-containing structures, thereby enhancing the stability and/or overall effectiveness of the disclosed solution/system.

Post-construction materials and structures that may be treated with the disclosed solutions/systems vary widely, and include structures such as reinforced or un-reinforced concrete assemblies or elements, mortar, stucco and the like. In exemplary embodiments of the present disclosure, the disclosed solution/system may be applied directly to the exterior surface of a reinforced and/or un-reinforced concrete structure and be permitted to penetrate to interior regions thereof, e.g., by capillary action.

As noted above, the additive composition provides at least three levels of protection to the treated structure/assembly. A first level of protection involves corrosion resistance protection. Thus, the solution/system is capable of migrating to a potential corrosive site and forming a monomolecular film thereon. Of note, the additive composition exhibits polarity at one molecular end thereof, thereby facilitating adherence and/or attachment with respect to oppositely charged polar/ionic substrates, for example, iron and/or other metallic molecules and the like, in the following manner:

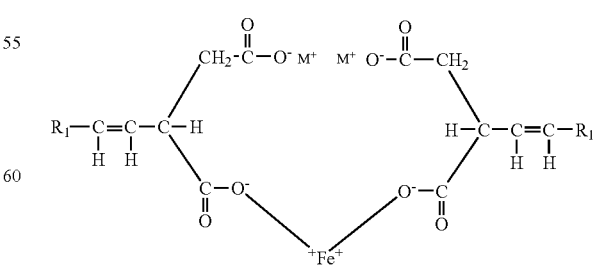

wherein $R_1$ is a $C_9$ to $C_{16}$ branched hydrocarbon and M+ is Na+ or K+.

A second level of protection is liquid moisture resistance that arises, at least in part, from a blockage effect that is achieved by the disclosed composition/system in situ. Because the additive composition is reactive, it will tend to react with, for example, metallic or other ions in the aqueous systems that it encounters and/or metallic or other ions that it encounters in the reinforcement materials/substrates associated with the post-construction structures/assemblies. Reaction with divalent metals advantageously forms long chain molecules that effectively obstruct capillaries or other passages within the concrete-containing structure. From one or more of the noted reactions (or other reactions that may occur due to the constituents present in or on the post-construction structure/assembly), molecules/compounds having limited water solubility, e.g., precipitates, are formed that include long hydrocarbon chains. These long chain hydrocarbon chains are generally hydrophobic. The disclosed in situ reactions generally involve a divalent metal, e.g. $Ca^{+2}$, assuming an intermediate position between respective molecules of the type disclosed herein, as follows:

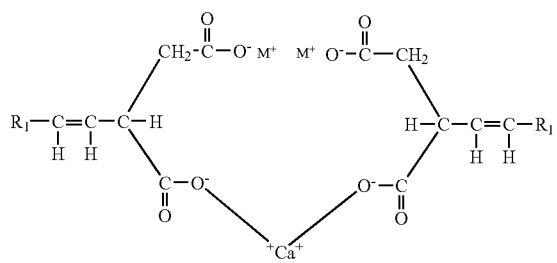

These long chain molecules can only be formed in the presence of water, since the disclosed material, composition or system must enter the aqueous phase for an ion exchange reaction of the type described herein to be initiated. Thus, upon exposure to moisture, e.g., by diffusion into a concrete capillary, the disclosed material/composition will solubilize and react with available divalent metals, e.g., $Ca^{+2}$, to form long chain molecules that impede/prevent further travel of the water molecules. The long chain molecules precipitate from the water, but form a physical barrier to further ingress of the water molecules, thereby providing advantageous waterproofing to the treated concrete structure/surface. Indeed, the precipitated materials, fill the capillaries, cracks and/or fissures of the post-construction structure/assembly, e.g., the hardened concrete substrate to which the disclosed solution/system was applied, thereby advantageously repelling water and preventing or reducing capillary absorption.

A third level of protection associated with the disclosed solutions/materials is moisture vapor barrier properties/functionalities that prevent or substantially reduce potential moisture flow through a concrete-containing structure/system. The noted moisture barrier properties have been demonstrated in various simulated conditions, e.g., simulated rain exposure and simulated groundwater exposure.

For further reference purposes and as is known by those skilled in the art, corrosion generally occurs in what may be described as an oxy-redux reaction, whereby electrons flow through the metal from the anode to the cathode. If the anode is protected, electrons from hydroxyls (OH—) are prevented from entering. Conversely, if the cathode is protected, electrons are prevented from flowing thereto.

For purposes of an electron-flow discussion, additive compositions according to the present disclosure generally protect the anode. As electrons flow, the anode develops a positive charge. The positively charged surface then attracts the strongly electronegative or hydrophilic end of the additive composition. Upon the additive composition reaching the surface, it generally bonds or attaches itself to the iron of the reinforcing steel to form a slightly soluble hydrophobic layer which protects the anode potential of the iron/reinforcing steel. With respect to exemplary embodiments of the disclosed treatment regimen wherein the post-construction material is concrete, the cured/hardened concrete generally contains water molecules in pores, cracks and/or fissures defined in the hardened concrete, such water molecules enabling the additive composition to migrate to the anodic surface of the reinforcing steel within the concrete structure. Additionally, excess additive composition generally reacts with calcium (or other impurities) to form substantially water insoluble molecules/compounds, e.g., precipitate molecules, that reduce the water permeability of the hardened concrete structure/assembly. This reduced permeability further mitigates the corrosion process and/or the potential for further corrosion of any underlying reinforcing steel.

As disclosed herein, the additive composition/system may be applied to the surface of existing concrete or mortar, i.e., a post-construction material, and generally functions to penetrate cracks in the concrete/mortar to reach reinforcing steel or other potentially corrosive materials positioned therewithin, thereby preventing corrosion of the steel while reducing liquid and moisture vapor permeability of the concrete. The additive composition may be applied by standard application methods including, for example, but not limited to, ponding or roller applied as well as high pressure and low pressure spraying applications.

In an exemplary embodiment of the present disclosure, approximately 1 gallon of the disclosed solution (20% active composition/80% water plus thinning agent at about 5% to 70% by weight) may be applied to 50 to 150 square feet of concrete surface. In other exemplary embodiments, prior to applying the disclosed solution composition to a surface, the surface may be cleaned, for example, or pressure washed to remove any existing laitance, contaminates, coatings, dirt and/or pollution. The surface may then preferably be rinsed with clean water and allowed an opportunity to dry prior to application of the additive composition. Optionally, more than one coat of the additive composition may be sequentially applied to the surface, e.g., 2 to 5 treatment applications.

To improve freeze/thaw properties, it is most effective to control air entrainment within cured concrete to about 5 to 8% with evenly spaced apart bubbles having a specific surface of from 600 to 1,100 square inches per cubic inch spaced apart by 0.004 to 0.008 inches. A defoaming agent is advantageously employed to address air entrainment. Exemplary defoaming agents include polyether modified polysiloxanes, tri-alkane/alkene phosphates and mixtures thereof. Alternative defoaming agents according to the present disclosure include ethoxylated acetylenic diols (Air Products and Chemicals, Inc.; Allentown, Pa.) and mixtures thereof. Polyether modified polysiloxanes are sold by BYK Chemie (Germany) under the trademarks BYK 025 and BYK 094. An exemplary phosphate for use as a defoaming agent according to the present disclosure is available from Akzo Nobel (Germany) under the trademark Phosflex 4 (tributyl phosphate).

According to exemplary embodiments of the present disclosure, a polyether modified polysiloxane is generally admixed in an amount from about 0.1 to 2.0% by weight, preferably about 1% by weight, relative to the disclosed water soluble materials, compositions and systems. Tri-alkane/alkene phosphates are generally admixed in an amount from about 1.0 to 8.0% by weight, preferably 5.0% by weight, relative to the disclosed water soluble materials, compositions and systems. Alternative defoaming agents may be employed, as will be readily apparent to persons skilled in the art. Additional stabilizing agents, such as benzoic acid, maleic acid and the like, may also be employed with the disclosed materials, compositions and systems.

Example 1

Moisture Vapor Barrier for Simulated Rain

ASTM Method F 1869 measures Moisture Vapor Emission Rate (MVER) of concrete slabs. In this method, the amount of water emitted by the concrete and picked up by a desiccant is measured over a three (3) day period. The value arising from the method has units of pounds per 1000 square feet of surface area per day. Lower values represent less emission of water and are beneficial in a variety of applications, e.g., flooring-related applications.

In an experiment to show the moisture barrier properties of the disclosed branched mixture/blend, 3-inch slabs of concrete made at a water/concrete ratio of 0.39 were cast and cured. One set of slabs was made with a 1 gallon per cubic yard dosage of the disclosed branched mixture/blend and the control slabs were fabricated without such addition. The slabs were dried in a 100° C. oven for three (3) days and cooled for one (1) day to remove pore water present from the mix water. Then, the slabs were immersed in water for fifteen (15) minutes which simulates an intense rain shower event. Post-immersion, the slabs were stored in a 50% relative humidity environment for fifteen (15) hours to remove surface water and to simulate flooring installation at a point in time somewhat after the rain event.

Results of the MVER testing are presented in FIG. 1. The test results show superior MVER performance for the concrete slabs treated with the disclosed branched mixture/blend as compared to the control slabs. The superior MVER performance would translate to, inter alia, an ability to initiate flooring installation more quickly after a rain shower (or other such event) based on the disclosed treatment modality.

Example 2

Moisture Vapor Barrier for Simulated Groundwater

In a second experiment, 3-inch slabs of concrete made at a water/concrete ratio of 0.39 were cast and cured. One set of slabs was made with 1 gallon per cubic yard dosage of the disclosed branched mixture/blend and the control slabs received no such addition. The slabs were dried in a 100° C. oven for three (3) days and cooled for one (1) day to remove pore water present from the mix water. Then, each slab was placed in a one (1) inch pool of water on the bottom side of the slab, with the top of the slab exposed to a controlled 50% relative humidity environment. ASTM F 1869 MVER tests were run periodically to measure the transport of moisture vapor through the slabs. This experiment simulates constant contact of groundwater on the bottom of the slab and measures the degree to which water is emitted through the top surface.

Figure 2:
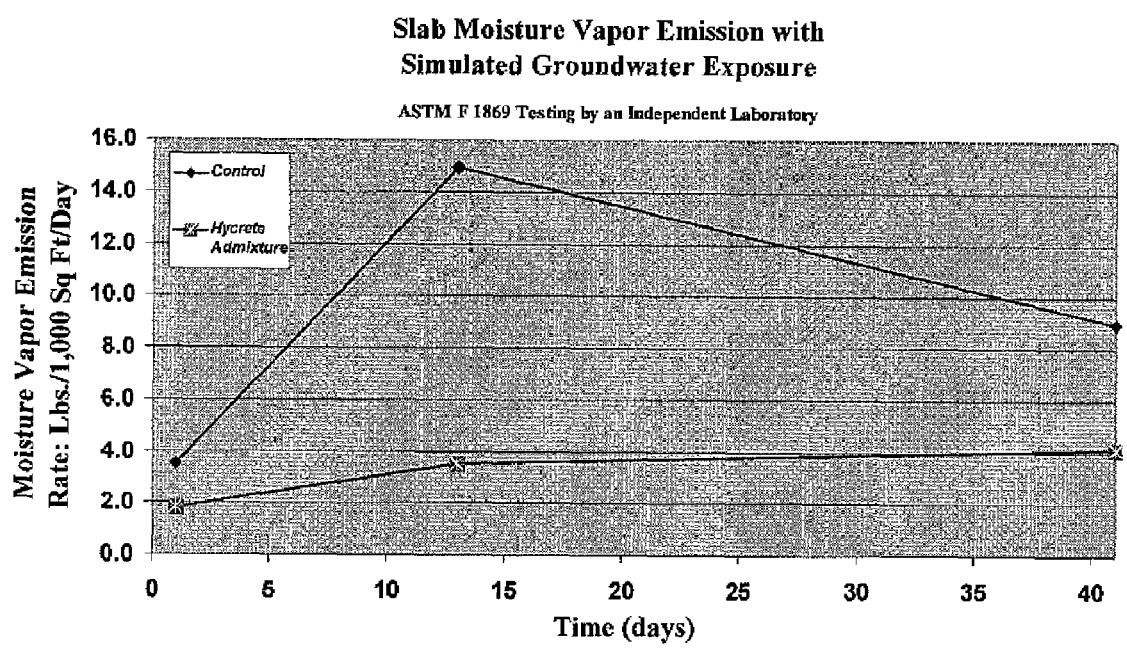
FIG. 2 is a plot of slab moisture vapor emission for concrete systems according to the present disclosure as compared to a control system with simulated groundwater exposure.

Results of the MVER testing as a function of time are presented in FIG. 2. The test results show superior MVER performance for the slabs treated with the disclosed branched mixture/blend. Indeed, at all measured points in time, the treated slabs demonstrated significantly reduced moisture vapor emission as compared to the control slabs. The superior MVER performance reflected in FIG. 2 offers would be evidenced in many commercial applications, e.g., in an extended useful life for flooring that is applied/bonded to a concrete slab due to less moisture vapor impinging on the flooring adhesive over time.

While the present invention has been described with respect to the exemplary embodiments thereof, it will be recognized by those of ordinary skill in the art that many modifications, enhancements, variations and/or changes can be achieved without departing from the spirit and scope of the invention. Therefore, it is manifestly intended that the invention be limited only by the scope of the claims and equivalents thereof.

What is claimed:

1. A method for enhancing moisture vapor barrier properties in a porous system, comprising:
   (a) providing a porous system;
   (b) adding a composition to the porous system, the composition including an active ingredient of the formula:

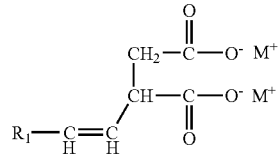

wherein $R_1$ is a $C_9$ to $C_{16}$ branched hydrocarbon and M+ is Na+, K+ or a combination thereof; and wherein the active ingredient comprises a blend or mixture of molecules having differing $R_1$ structures; and
   (c) after the composition is added to the porous system, impeding moisture vapor transmission through the porous system, wherein the moisture vapor transmission through the porous system is impeded based at least in part on the presence of the composition in the porous system.

2. The method according to claim 1, wherein the porous system is a concrete-containing system.

3. The method according to claim 1, wherein the active ingredient is dissolved in an aqueous solution.

4. The method according to claim 3, wherein the aqueous solution further comprises a thinning agent in an amount of about 5% to about 70% by weight.

5. The method according to claim 4, wherein the thinning agent is selected from the group consisting of isopropyl alcohol, ethanol, xylene and combinations thereof.

6. The method according to claim 1, wherein the composition further comprises a defoaming agent.

7. The method according to claim 6, wherein the defoaming agent is selected from the group consisting of a polyether modified polysiloxane, a tri-alkane/alkene phosphate, an ethoxylated acetylenic diol, and mixtures thereof.

8. The method according to claim 1, wherein the blend or mixture of the active ingredient has a weighted average of about $C_{12}$.

9. The method according to claim 1, wherein the blend or mixture of the active ingredient includes Na+ at a level of about 90 to 100 weight percent and K+ at a level of about 0 to 10 weight percent.

10. The method according to claim 1, wherein the porous system is a concrete-containing system, and further comprising applying flooring material to at least a portion of the concrete-containing system after adding the composition thereto and after the concrete-containing system has hardened.

11. A method for effecting enhanced moisture vapor barrier properties in a concrete-containing material, comprising:
(a) providing a composition including an active ingredient having a formula:

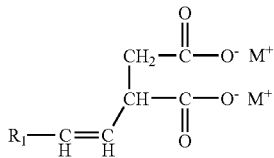

wherein $R_1$ is a $C_9$ to $C_{16}$ branched hydrocarbon and M+ is Na+, K+ or a combination thereof; and wherein the active ingredient comprises a blend or mixture of molecules having differing $R_1$ structures;
(b) combining the composition with a concrete-containing structure or surface; and
(c) after the composition is combined with the concrete-containing structure or surface, impeding passage of moisture vapor through the concrete-containing structure or surface, wherein the passage of moisture vapor through the concrete-containing structure or surface is impeded at least in part based on the presence of the composition in the concrete-containing structure or surface.

12. The method according to claim 11, wherein the composition is combined with the concrete-containing structure or surface in an amount sufficient to impart waterproofing properties to the concrete-containing structure or surface.

13. The method according to claim 11, wherein the concrete-containing structure or surface is a concrete-water mixture, and the composition is combined with the concrete-water mixture during formulation of the concrete-water mixture.

14. The method according to claim 11, wherein the concrete-containing structure or surface is a post-construction structure or material; and wherein the composition is combined with the post-construction structure or material by applying the composition directly to a surface of the post-construction structure or material after the post-construction structure or material has hardened.

15. The method according to claim 14, further comprising the step of adding a thinning agent in an amount of about 5% to about 70% by weight to the composition prior to application of the composition to said surface.

16. The method according to claim 15, wherein the thinning agent is selected from the group consisting of isopropyl alcohol, ethanol, xylene and combinations thereof.

17. The method according to claim 14, wherein the post-construction material comprises existing reinforced or unreinforced concrete.

18. The method according to claim 14, further comprising a reapplication of the composition to the surface of the hardened post-construction structure or material.

19. The method according to claim 11, wherein the concrete-containing structure or surface is a post-construction structure or material; and wherein the composition is combined with the post-construction structure or material that includes at least one constituent selected from the group consisting of concrete, mortar, stucco and steel.

20. The method according to claim 11, wherein the concrete-containing structure or surface is a post-construction structure or material; and wherein the composition is combined with the post-construction structure or material by an application mechanism selected from the group consisting of spray application, brush application, mist application, and combinations thereof.

* * * * *